Oct. 2, 1934.  L. X. ANTELME  1,975,675
MECHANICAL REGULATION OR TENSION INDICATOR
Filed April 27, 1933  2 Sheets-Sheet 1
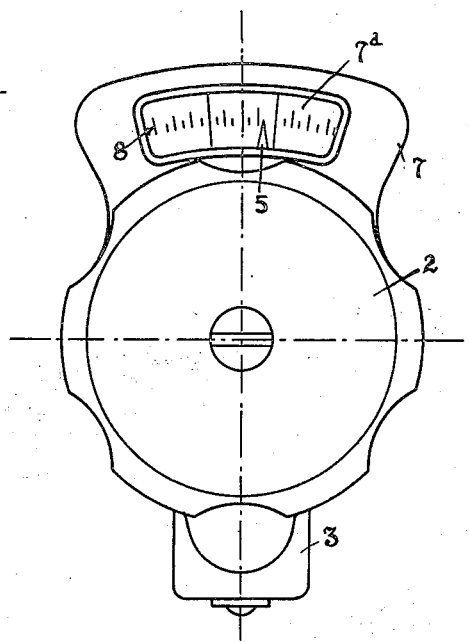
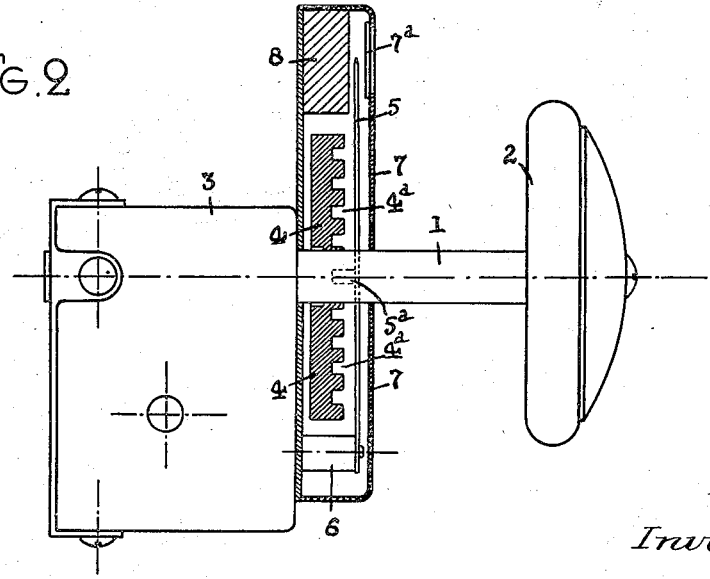
Inventor
Louis X. Antelme
By William C. Linton
Attorney.

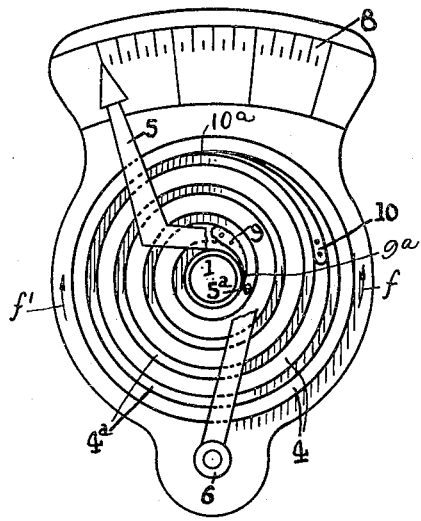
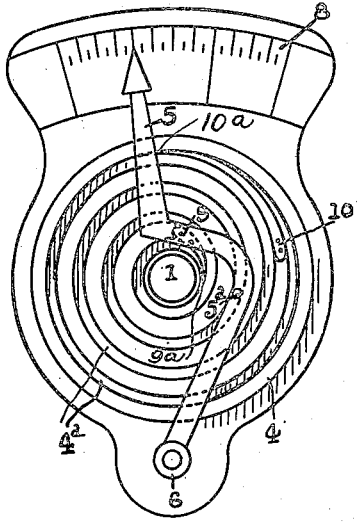
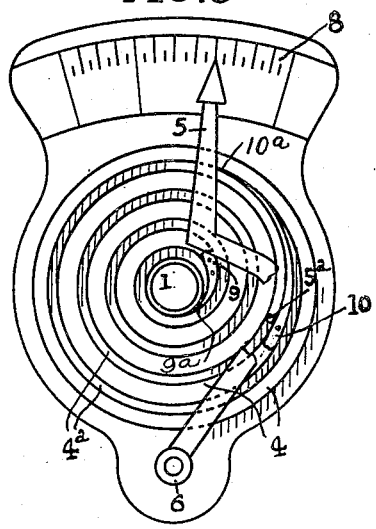
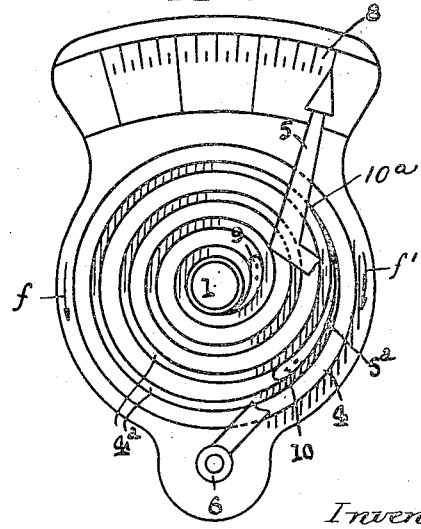

Patented Oct. 2, 1934

1,975,675

UNITED STATES PATENT OFFICE 1,975,675

MECHANICAL REGULATION OR TENSION INDICATOR

Louis Xavier Antelme, Paris, France

Application April 27, 1933, Serial No. 668,263
In France May 13, 1932

2 Claims. (Cl. 116—124)

My invention relates to a mechanical regulation or tension indicator adapted to be applied more particularly to the devices for regulating shock absorbers for vehicles of all kinds from a distance.

It consists essentially of a disc keyed on the spindle of the control handle and formed with a groove of spiral form in which engages a stud integral with a pointer pivoted at one of its ends, the other end of the pointer being adapted to move over a scale comprising graduations or suitable indications and the whole being contained in a casing of suitable shape provided with an observation window.

The accompanying drawings, given simply by way of example, show one of the methods of carrying out this invention.

Fig. 1 is a front elevation of the device,

Fig. 2 is a side elevation partly in section, and

Figs. 3, 4, 5 and 6 are front elevations showing the parts in four different positions, the casing and the handle being removed.

In the drawings, 1 indicates the spindle of the handle 2 engaging in the casing 3 containing the remote regulating device. On the spindle 1 is keyed a disc 4 formed with a spiral groove 4ª in which engages a stud or projection 5ª of a pointer 5, of suitable shape and pivoted at 6 to the casing 7. This latter comprises a window 7ª opposite a scale 8. At the ends of the groove are arranged switch points 9 and 10.

The operation of this device is as follows:

To regulate from a distance the tightening, for example, of shock absorbers, the handle 2 is rotated clockwise. The grooved disc 4 is carried round by the spindle 1 so that the stud 5ª and consequently the pointer 5 with which it is integral, are actuated towards the right, rotating about the pivot 6 of the pointer 5, the tip of which moves towards the right in front of the suitably graduated scale 8. In the contrary case, on loosening, the reverse movement is produced. To prevent the device being damaged by a tightening or loosening taking place to a greater extent than that provided for and shown by the scale, the switch points 9 and 10 permit a continuation of the rotation of the handle 2 in the respective direction when the pointer 5 has reached its one or other extreme position, while if the direction of rotation of the handle is reversed the respective switch point 9 or 10 causes the projection 5ª and consequently the pointer 5 to take up again a movement in the direction corresponding to the direction of rotation of the handle 2. For example, the pointer being in the position of Fig. 3, if the handle 2 is rotated clockwise, that is to say in the direction indicated by the arrow $f'$, the positions shown in Figs. 4 and 5 will be passed through successively. When the whole is in the position of Fig. 6, that is to say, at the end of the movement of the pointer 5, the handle 2 may still be rotated without harm, the pointer 5 remaining in its position and the switch point 10 allowing the passage of the projection 5ª. On turning in the opposite direction, that is, in the direction indicated by the arrow $f$, the switch point 10, on being passed by the projection 5ª causes this to engage in the spiral groove 4ª, and to approach the centre together with the pointer 5 integral therewith.

It is evident that, if necessary, other methods of execution might be adopted without departing from the scope of the invention as defined by the appended claims.

It is, furthermore, evident that this invention lends itself to many and various applications. For example, it may be applied to the controls of lighting, route and direction indicators, to the controls of thermostats or rheostats of all kinds, etc.

In a general way, this device may serve to indicate the position, the degrees of power or the magnitude of the action or the effects of an apparatus actuated by a suitable control, the indications being graduations, figures, signs, etc., lamps, or bells, the pointer being adapted to make contact on terminals in the last two cases.

I claim:

1. An indicator device of the character described comprising, a rotatable member formed with a spiral groove, an indicating pointer pivoted adjacent said member and having means engaged within the groove of the latter whereby to operate said pointer, and switch points arranged at each extremity of the spiral groove on said member for permitting the disengagement of the indicating pointer at the end of its travel in one direction or the other and for causing the reengagement of said pointer as soon as the direction of movement is reversed.

2. An indicator device of the character described comprising, a setting handle, a disc rigid with said setting handle for movement therewith and formed with a spiral groove, a scale, an indicating pointer pivotally mounted adjacent said disc and having a projection engaged within the groove of the latter whereby to displace said pointer over the scale, and switch points arranged at each extremity of the spiral groove on said disc for permitting the disengagement of the indicating pointer at the end of its travel in one direction or the other and for causing the reengagement of said pointer as soon as the direction of movement is reversed.

LOUIS XAVIER ANTELME.